(12) United States Patent
Hoshino et al.

(10) Patent No.: US 8,517,460 B2
(45) Date of Patent: Aug. 27, 2013

(54) VEHICLE BODY REAR STRUCTURE

(75) Inventors: Shigeo Hoshino, Wako (JP); Naoki Hashirayama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 28 days.

(21) Appl. No.: 13/500,426

(22) PCT Filed: Aug. 27, 2010

(86) PCT No.: PCT/JP2010/064593
§ 371 (c)(1),
(2), (4) Date: Apr. 5, 2012

(87) PCT Pub. No.: WO2011/045982
PCT Pub. Date: Apr. 21, 2011

(65) Prior Publication Data
US 2012/0200109 A1 Aug. 9, 2012

(30) Foreign Application Priority Data
Oct. 13, 2009 (JP) .................................. 2009-236176

(51) Int. Cl.
*B62D 25/08* (2006.01)

(52) U.S. Cl.
USPC ..................................................... 296/193.08

(58) Field of Classification Search
USPC ..................................................... 296/193.08
See application file for complete search history.

(56) References Cited

FOREIGN PATENT DOCUMENTS

| JP | 05-050947 | 3/1993 |
|---|---|---|
| JP | 10-218030 | 8/1998 |
| JP | 11-115597 | 4/1999 |
| JP | 2005-170228 | 6/2005 |
| JP | 2006-193047 | 7/2006 |
| JP | 2007-098976 | 4/2007 |
| JP | 2008-062748 | 3/2008 |

*Primary Examiner* — H Gutman
(74) *Attorney, Agent, or Firm* — Rankin, Hill & Clark LLP

(57) ABSTRACT

A vehicle body rear structure comprises a rear wheelhouse inner panel (13) which is provided with a seat striker (38) which disengages from an engagement part (16*a*) of a folding seat back (16). The rear wheelhouse inner panel (13) includes a wheelhouse extending part (13B) which extends integrally upward from the upper end of a wheelhouse base (13A). A stiffener (36) is attached to the wheelhouse extending part (13B). The wheelhouse extending part (13B) and the stiffener (36) form a dogleg-shaped closed section. The seat striker (38) is attached to a bracket (37) provided on the stiffener (36).

4 Claims, 7 Drawing Sheets

VEHICLE BODY REAR STRUCTURE

TECHNICAL FIELD

The present invention relates to an improvement in a vehicle body rear structure of a vehicle provided with a folding seat back.

BACKGROUND ART

There has been known a vehicle body rear structure wherein a folding seat back of a rear seat is engaged with a suspension tower of a vehicle body, as disclosed in Patent Literature 1.

According to the vehicle body rear structure disclosed in Patent Literature 1, a latch plate is provided on a rear seat back, a suspension tower is provided on a rear wheelhouse inner at the vehicle body side, and a striker is attached to an upper end portion of the suspension tower via an attaching plate, wherein the latch plate is adapted to engage with the striker.

PRIOR ART DOCUMENTS

Patent Literature

Patent Literature 1: Japanese Patent Application Laid-Open Publication No. 11-115597

SUMMARY OF INVENTION

Technical Problem

In a case where the engagement position between the latch plate and the striker is close to the suspension tower, it is possible to attach the striker to the highly rigid suspension tower so as to support or bear a load acting on the rear seat back. However, in the case where the seat striker is apart from the suspension tower, the seat striker requires, for its attachment to the suspension tower, a large-sized stiffener extending from the suspension tower to the seat striker. The seat striker may be further required to be attached to the stiffener via a patch depending on a shape of the stiffener. Consequently, the weight of components (the stiffener, the patch and the like) to ensure stiffness for supporting the striker is increased and the number of parts or parts count increases as well.

An object of the present invention is to provide a vehicle body rear structure which is capable of achieving reduction in weight and parts count while ensuring seat striker supporting stiffness even when the position of a seat striker position is apart from a damper attaching portion which supports a suspension.

Solution to Problem

According to an aspect of the present invention, there is provided a vehicle body rear structure, comprising: a seat including a folding seat back; a rear wheelhouse inner panel forming a part of a vehicle body and curved to protrude toward an inner side of the vehicle body in a vehicle width direction; and a seat striker provided for undertaking engaging and disengaging between an engaging part provided on a rear face of the seat back and the rear wheelhouse inner panel, wherein the rear wheelhouse inner panel includes a wheelhouse base forming a lower half part of the rear wheelhouse inner panel and a wheelhouse extension extending integrally upward from an upper end of the wheelhouse base, a stiffener attached to a vehicle-interior-side surface of the wheelhouse extension and the rear wheelhouse inner panel form a dogleg-shaped closed cross-section, and the seat striker is attached to a bracket provided on at a vehicle-interior-side surface of the stiffener.

Preferably, the stiffener is joined to the wheelhouse extension by welding, the bracket is joined to the stiffener by welding, and the number of welded portions between the wheelhouse extension and the stiffener is larger than the number of welded portions between the stiffener and the bracket.

Preferably, the wheelhouse extension has a flange at an upper end thereof, and the upper end flange is joined to a roof rail.

Preferably, the stiffener and a damper attaching portion provided on the rear wheelhouse inner panel are joined continuously along a curved surface of the rear wheelhouse inner panel.

Preferably, the damper attaching portion has an upper surface, and the upper surface of the damper attaching portion is connected to a roof rail via a reinforcement member.

Advantageous Effects of Invention

According to the present invention, the wheelhouse extension of which cross-section is formed as being curved obtains high stiffness in the vehicle width direction. Further, since the dogleg-shaped closed cross-section is formed with the stiffener, it is possible to ensure stiffness of the seat striker attaching portion which is constituted by the wheelhouse extension, the stiffener, and the bracket.

Thus, it becomes possible to increase stiffness of the seat striker attaching portion separately from the damper attaching portion. Accordingly, it is not required to arrange a large-sized stiffener extended from the damper attaching portion to the seat striker attaching portion, a patch for reinforcement and the like for increasing stiffness of the seat striker attaching portion using high stiffness of the damper attaching portion. Here, only a small-sized stiffener works. That is, even if the seat striker is apart from the damper attaching portion having high stiffness arranged at the wheelhouse inner panel, it is not required to increase stiffness using a large-sized stiffener and a patch. Here, it is possible to use a small-sized stiffener for reinforcing the seat striker attaching portion, so that reduction in weight and parts count can be achieved.

The number of welded portions of each component in the seat striker attaching portion becomes large as approaching from the seat striker to the rear wheelhouse inner panel, so that the load acting on the seat striker is more likely to be distributed to the rear wheelhouse inner panel. That is, the load acting on the seat can be more likely to be distributed as being transmitted in the order of the striker, the bracket, the stiffener, and the rear wheelhouse inner panel.

Compared to a case where the upper end of the rear wheelhouse inner panel is not joined to the roof rail, stiffness of the rear wheelhouse inner panel is increased and the load transmitted from the seat side to the rear wheelhouse inner panel via the seat striker is transmitted from the rear wheelhouse inner panel to the roof rail. That is, the seat load acting on the seat is distributed from the rear wheelhouse inner panel to the roof rail.

Since the stiffener and the damper attaching portion provided on the rear wheelhouse inner panel are joined continuously along the curved surface of the rear wheelhouse inner panel, the rear wheel house inner panel is continuously reinforced by the stiffener and the damper attaching portion.

Since the upper surface of the damper attaching portion is connected to the roof rail via the reinforcement member, the damper attaching portion is reinforced by the reinforcement member itself and connection with the roof rail. That is, the damper attaching portion is reinforced, so that damper supporting stiffness can be increased. Further, the seat striker attaching portion is reinforced owing to connection between the damper attaching portion and the stiffener, so that the seat can be supported further strongly.

DESCRIPTION OF EMBODIMENTS

A preferred embodiment of the present invention will be described below with reference to the attached sheets of drawings.

Embodiment

Figure 1:
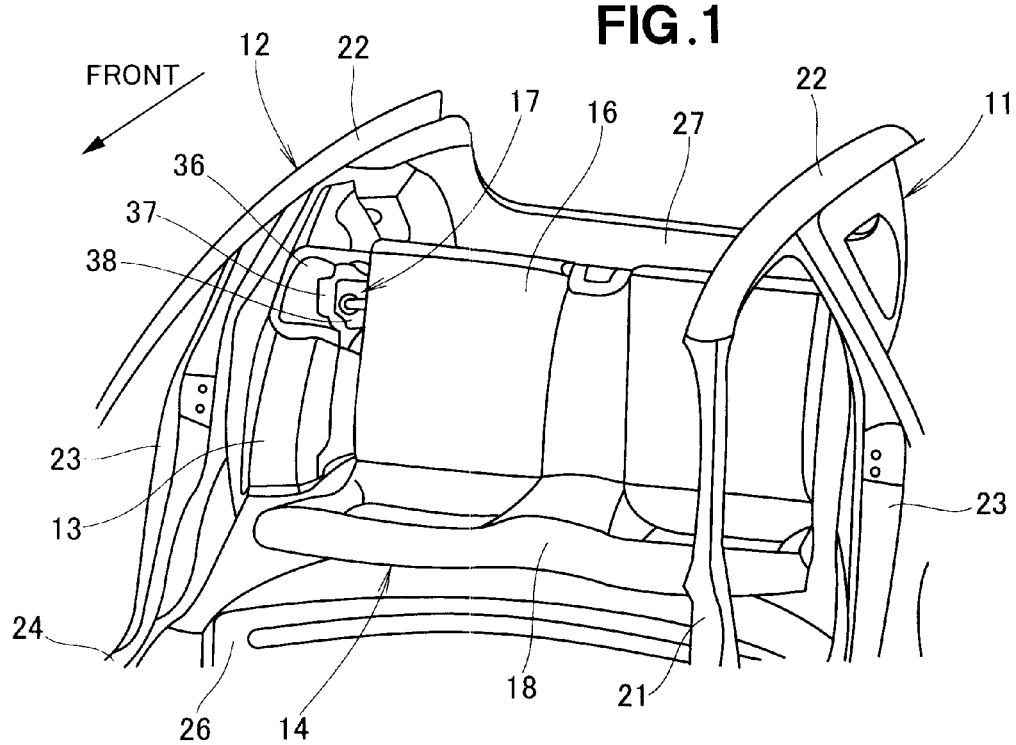
FIG. 1 is a perspective view of a vehicle body rear structure of an embodiment of the present invention as viewed from the front side of a vehicle body.

As shown in FIG. 1, a rear wheelhouse inner panel 13 is provided at each rear part of a left side body 11 and a right side body 12 that constitute a vehicle body (here, only one numeral 13 is indicated). A rear seat 14 includes a folding seat back 16 and a seat cushion 18. The seat back 16 is swingably attached to a rear end part of the seat cushion 18. The seat back 16 is releasably engaged with each rear wheelhouse inner panel 13 via an engaging device 17.

Lest and right roof side rails 22 are extended rearward respectively from upper end parts of left and right center pillars 21 (here, only one side is illustrated). The left and right center pillars 23 are extended downward respectively from longitudinal intermediate portions of the left and right roof side rails 22. Lower end parts of the center pillars 23 are supported respectively by left and right side sills 24 (here, only one side is illustrated). A middle floor-cross member 26 connects the left and right side sills 24. A rear panel 27 is disposed behind the seat back 16.

Figure 2:
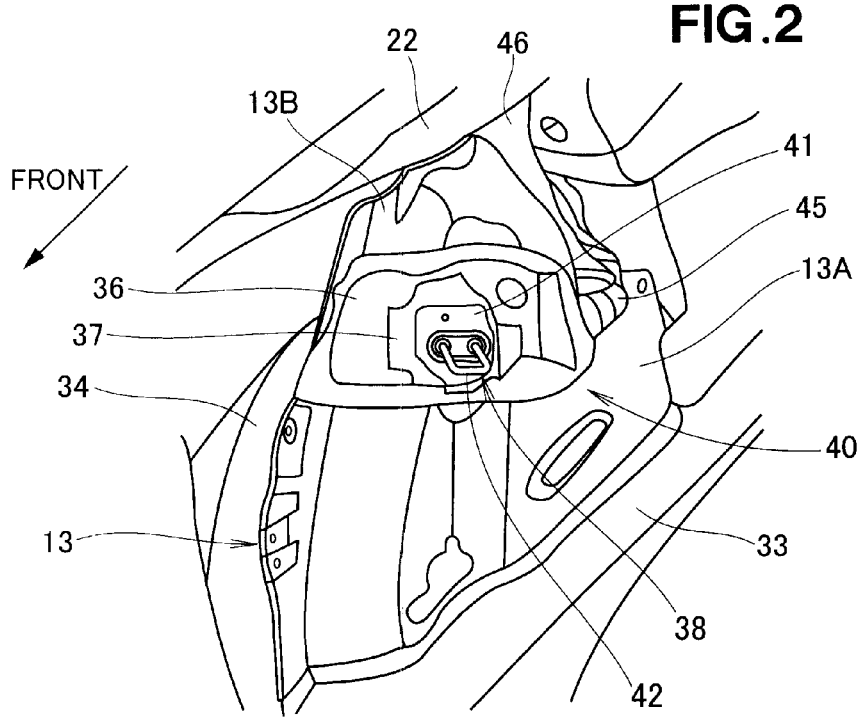
FIG. 2 is a perspective view illustrating a seat striker attaching portion shown in FIG. 1.

As illustrated in FIG. 2, the rear wheel house inner panel 13 includes a wheelhouse base 13A which constitutes a lower half part and a wheelhouse extending part or extension 13B which extends integrally upward from the wheelhouse base 13A. A lower end part of the wheelhouse base 13A is attached to a rear floor panel 33 and a rear frame (not illustrated). A front end part and a rear end part of each of the wheelhouse base 13A and the wheelhouse extension 13B are attached to a rear wheelhouse outer panel 34. An upper end part of the wheelhouse extension 13B is attached to the roof side rail 22.

The wheelhouse base 13A and the wheelhouse extension 13B are curved to protrude toward an inner side of the vehicle body in the vehicle width direction. A panel-shaped stiffener 36 is attached by welding to the wheelhouse base 13A and the wheelhouse extension 13B respectively from a front face to a side face. A plate-shaped bracket 37 is attached to the stiffener 36 by welding. Further, a seat striker 38 is fastened to the bracket 37. A seat striker attaching portion 40 is formed with the wheelhouse base 13A, the wheelhouse extension 13B, the stiffener 36 and the bracket 37.

Figure 6:
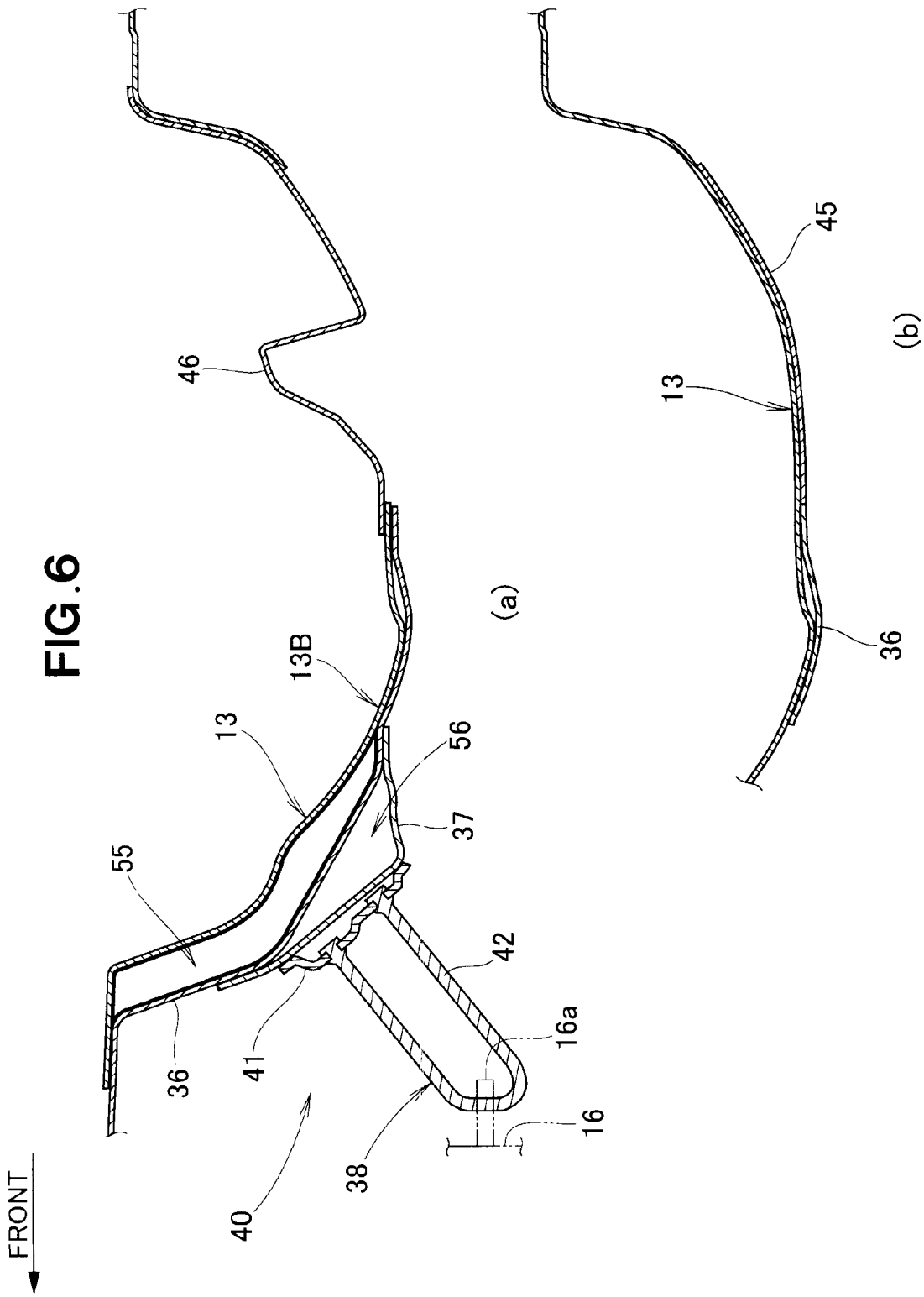
FIG. 6(a) is a cross-sectional view taken along line 6a-6a of FIG. 4.
FIG. 6(b) is a cross-sectional view taken along line 6b-6b of FIG. 4.

The seat striker 38 is a component constituting the engaging device 17 with an engaging part 16a (in FIG. 6(a)) which is provided on a rear face of the seat back 16 illustrated in FIG. 1. The seat striker 38 includes a base plate 41 attached to the bracket 37 and a striker main body 42 attached to the base plate 41.

The upper end part of a damper which constitutes a rear suspension is attached to a damper attaching portion 45 which is formed of a panel. The damper attaching portion 45 is attached to a rear part of the rear wheelhouse inner panel 13 as being continued to a rear end of the stiffener 36. Further, a damper attaching portion stiffener 46 to reinforce the damper attaching portion 45 is attached to the rear wheelhouse inner panel 13 and an upper face of the damper attaching portion 45.

Figure 4:
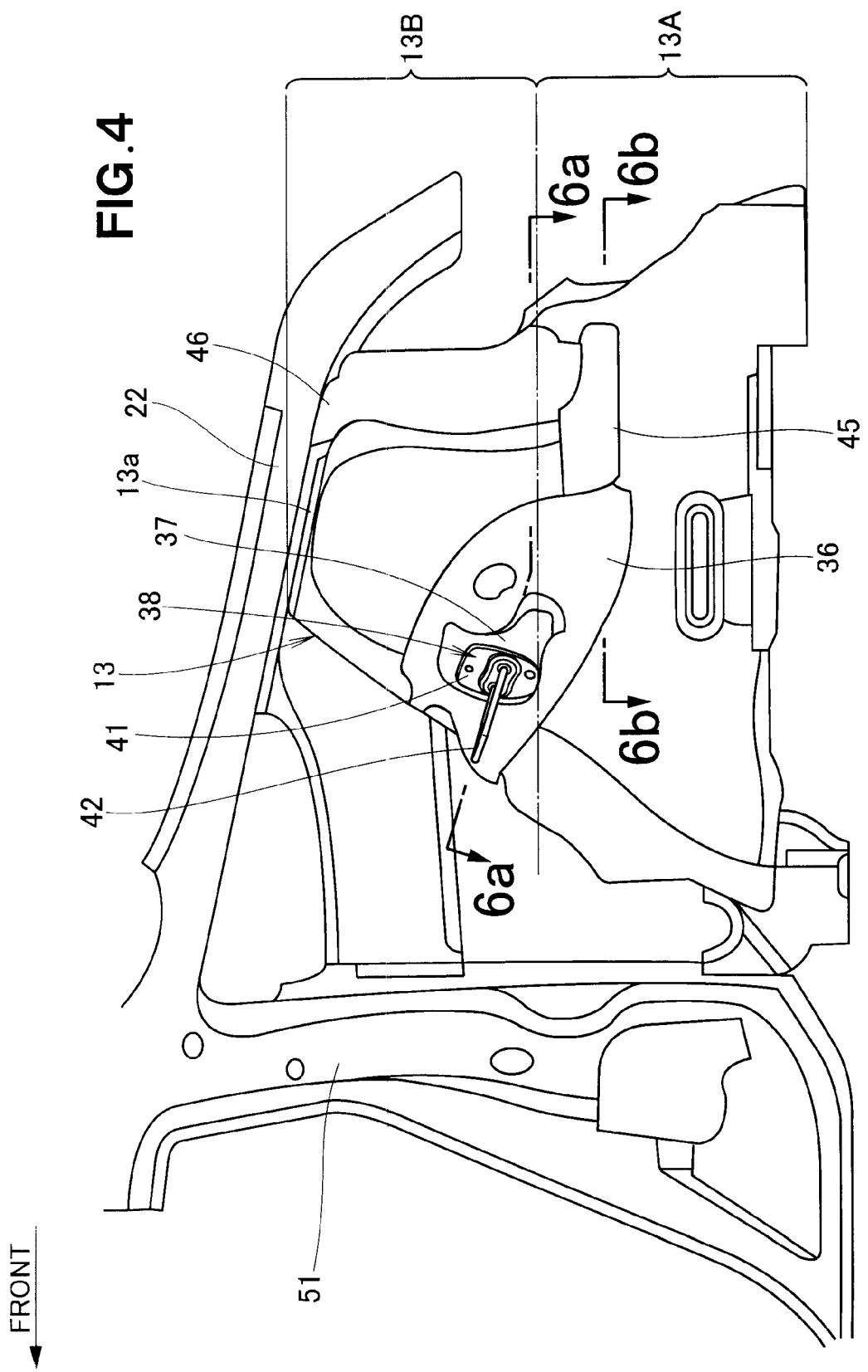
FIG. 4 is a side view of the seat striker attaching portion of FIG. 2, as viewed from the inside of a vehicle room.
Figure 5:
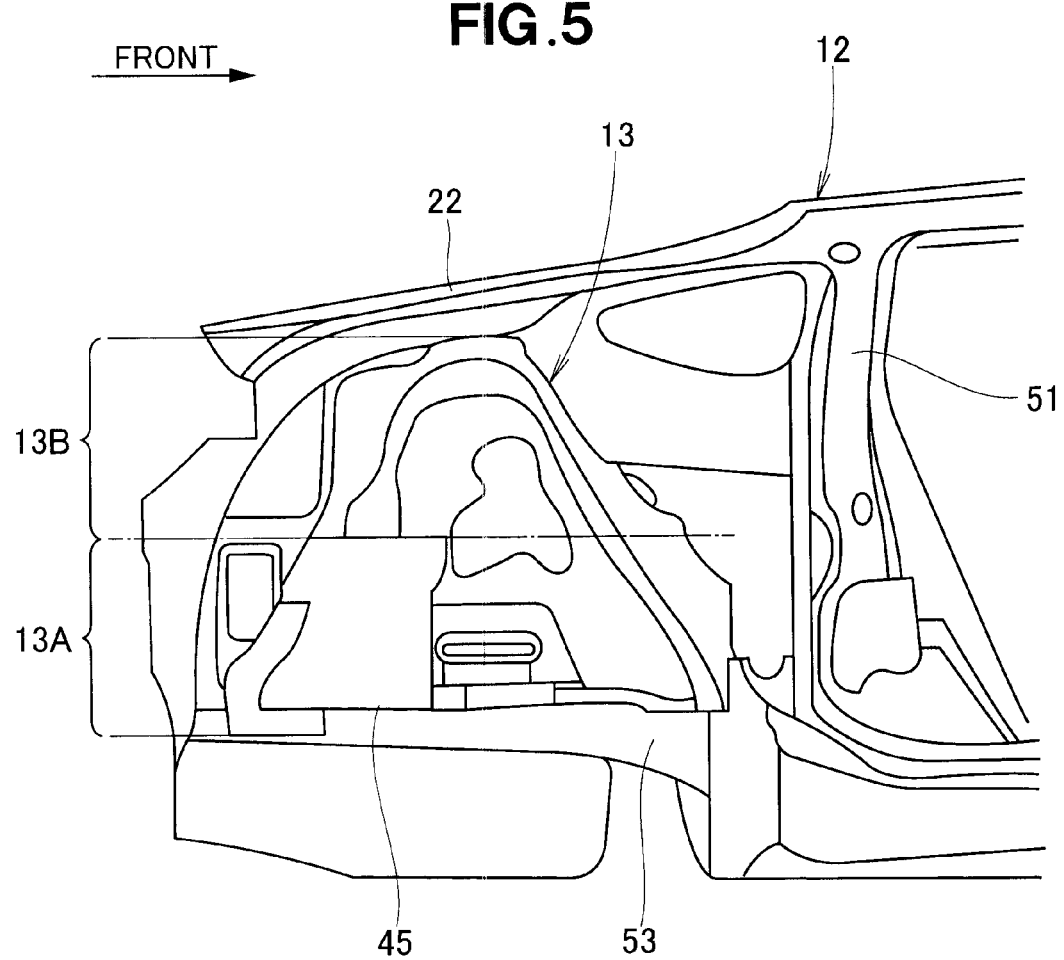
FIG. 5 is a side view of a rear wheelhouse inner panel as viewed from the outside of the vehicle room.

As illustrated in FIG. 4, the rear wheelhouse inner panel 13 is a trapezoid-like member including the wheelhouse base 13A to which the damper attaching portion 45 is attached and the wheelhouse extension 13B which extends upward from the wheelhouse base 13A. A lower side of the trapezoid-like rear wheelhouse inner panel 13 is attached to the rear floor panel 33 (FIG. 2) and a rear frame 53 (FIG. 5). An upper side of the rear wheelhouse inner panel 13 is attached to the roof side rail 22.

With the above attaching structure, stiffness of the rear wheelhouse inner panel 13 can be increased. Further, since the upper end part of the damper attaching portion stiffener 46 is attached to the roof side rail 22, the damper attaching portion 45 can be further reinforced.

FIG. 5 is a view of a center inside panel 51 and the rear wheelhouse inner panel 13 as viewed from the outside of a vehicle room excluding a rear outside panel (not illustrated) of the right side body 12 and the rear wheelhouse outer panel 34 (FIG. 2).

The rear frame 53 extends in the vehicle body front-back direction. The lower end part of the rear wheelhouse inner panel 13 is attached to the rear frame 53. The lower end part of the center inside panel 51 is attached to the rear frame 53 and the upper end part thereof is attached to the roof side rail 22.

FIG. 6(a) illustrates a cross-section along line 6a-6a of FIG. 4. The rear wheelhouse inner panel 13 curved to protrude toward the inside of the vehicle room is joined with the stiffener 36 curved to similarly protrude toward the inside of the vehicle room, so that a first space 55 defined by a dogleg-shaped closed cross-section is formed between the rear wheelhouse inner panel 13 and the stiffener 36.

Further, the stiffener 36 is joined with the bracket 37 curved to protrude toward the inside of the vehicle room, so that a second space 56 defined by a closed cross-section is formed between the stiffener 36 and the bracket 37. In this manner, by forming the closed cross-sections at the seat striker attaching portion 40, stiffness of the seat striker attaching portion 40 can be further increased.

The striker main body 42 of the seat striker 38 extends obliquely and laterally frontward from the bracket 37, and the engaging part 16a of the seat back 16 (FIG. 1) is engaged with a top end part of the striker main body 42. Accordingly, a load in the front-rear direction acting on the seat back 16, especially a rearward seat load, acts on the striker main body 42 via the engaging part 16a.

At that time, since the two closed cross-sections (i.e., the first space 55 and the second space 56) are located in a front side of the rear wheelhouse inner panel 13, the rearward seat load is more likely to be supported by the entire seat striker attaching portion 40. Accordingly, load supporting can be effectively performed. Therefore, required stiffness can be ensured even if thickness of the stiffener 36 and the bracket 37 is lessened, so that reduction in weight can be achieved.

FIG. 6(b) illustrates a cross-section along line 6b-6b of FIG. 4. The stiffener 36 and the damper attaching portion 45 are continuously attached to the rear wheelhouse inner panel 13. Thus, by continuously attaching the stiffener 36 and the damper attaching portion 45, the reinforcement effect of the rear wheelhouse inner panel 13 is further enhanced. Further, it is possible to obtain a stiffness increasing effect of the seat striker attaching portion 40 due to the damper attaching portion 45.

Next, attaching procedure of the seat striker 38 will be described based on FIGS. 7A to 7D.

Figure 7A:
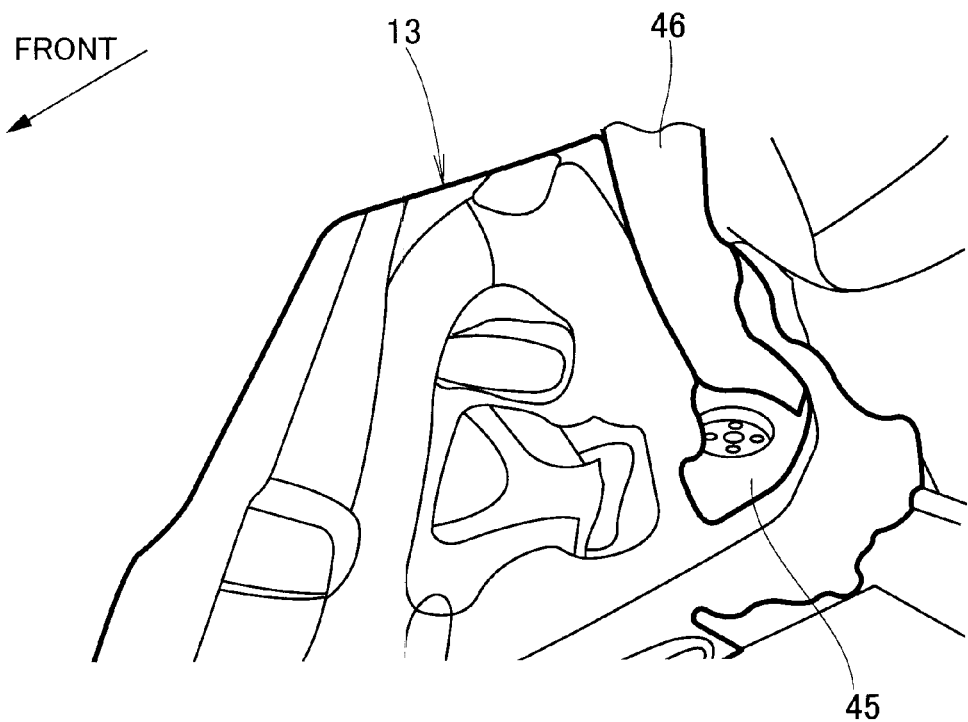
FIG. 7A is a view illustrating a vehicle-interior-side surface of the rear wheelhouse inner panel.

FIG. 7A illustrates a vehicle-interior-side surface of the rear wheelhouse inner panel 13. The rear wheelhouse inner panel 13 is curved to protrude toward the vehicle room side.

Figure 7B:
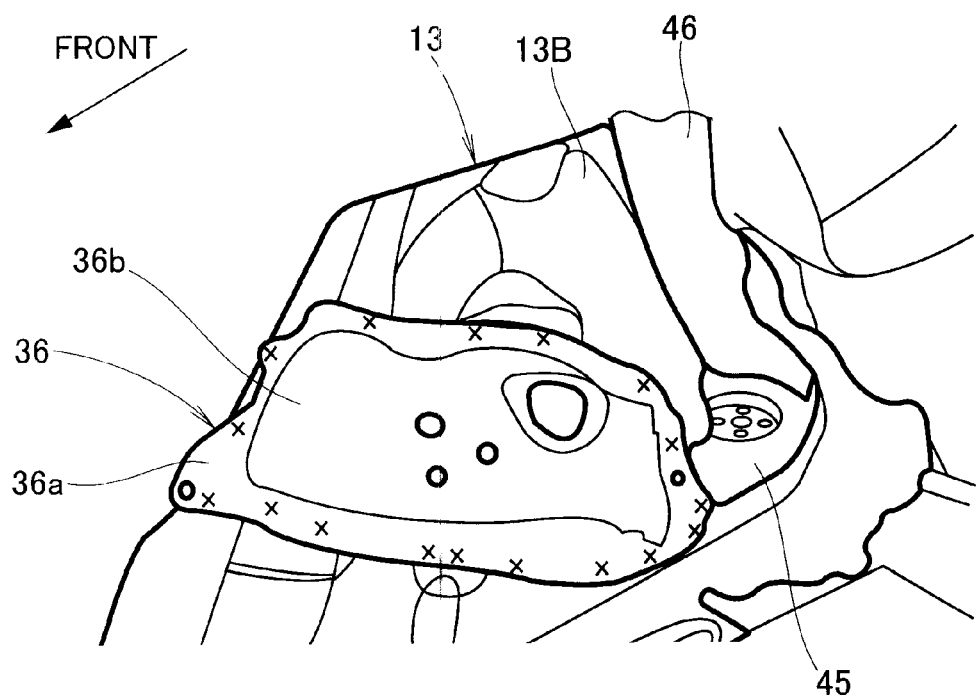
FIG. 7B is a view illustrating a state where a stiffener is attached to the rear wheelhouse inner panel by welding.

FIG. 7B illustrates a state where the stiffener 36, more specifically, a flange 36a formed at an edge of the stiffener 36, is attached to the rear wheelhouse inner panel 13 by welding. The stiffener 36 has a protruded wall 36b formed integrally with a portion thereof surrounded by the flange 36a and projecting in a stepped manner from the flange 36a to the vehicle room side.

By thus providing the protruded wall 36b, the dogleg-shaped closed cross-section is formed between the rear wheelhouse inner panel 13 and the protruded wall 36b. x-marks at the flange 36a indicate welded portions of the flange 36a relative to the rear wheelhouse inner panel 13 by spot welding. Here, the number of the welded portions is seventeen.

Figure 7C:
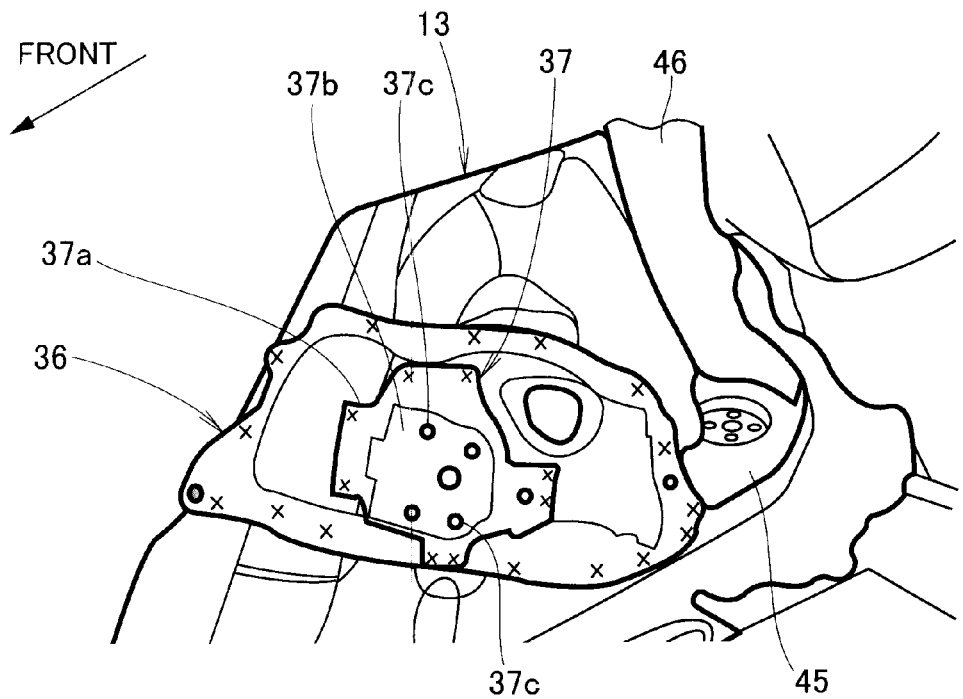
FIG. 7C is a view illustrating a state where a bracket is attached to the stiffener by welding.

FIG. 7C illustrates a state where the bracket 37, more specifically, an edge portion 37a of the bracket 37, is attached to the stiffener 36 by welding. A protruded flat wall 37b which is flat as being protruded to the vehicle room side from the edge portion 37a is formed at a part of the bracket 37 surrounded by the edge portion 37a.

By thus providing the protruded flat wall 37b, the closed cross-section is formed between the stiffener 36 and the bracket 37. Accordingly, the seat striker 38 can be attached to the protruded flat wall 37b with bolts and nuts. Bolt-insertion holes 37c, 37c are formed at the protruded flat portion 37b through which bolts for fastening the seat striker 38 pass. x-marks at the edge portion 37a of the bracket 37 indicate welded portions of the edge portion 37a relative to the stiffener 36 by spot welding. Here, the number of the welding positions is eight.

Figure 7D:
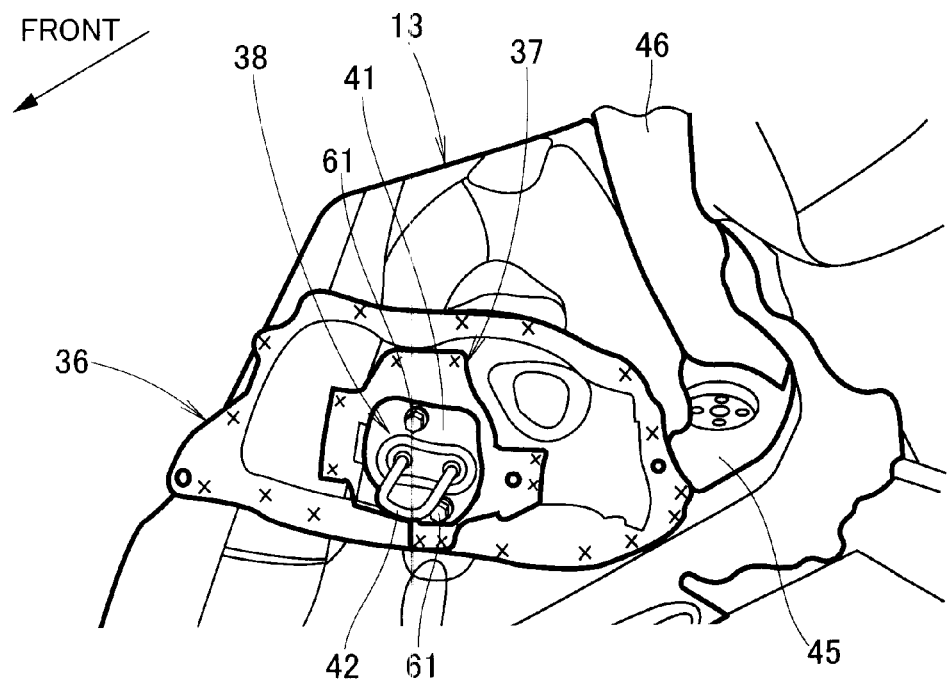
FIG. 7D is a view illustrating a state where a seat striker is fastened by bolts to a protruded flat portion of the bracket.

FIG. 7D illustrates a state where the seat striker 38 is fastened to the protruded flat portion 37b (FIG. 8C) of the bracket 37 with two bolts 61, 61 and nuts (not illustrated) attached to a back face of the protruded flat wall 37b. Thus, attaching of the seat striker 38 is completed.

In FIGS. 7B and 7C, since the number of welded portions of the stiffener 36 is larger than the number of welded portions of the bracket 37, joint stiffness between the rear wheelhouse inner panel 13 and the stiffener 36 is larger than joint stiffness between the stiffener 36 and the bracket 37 and the load acting on the seat striker 38 from the rear seat 14 (FIG. 1) side can be transmitted as being distributed to a wide area of the rear wheelhouse inner panel 13 from the bracket 37. Accordingly, stress concentration at the seat striker attaching portion 40 can be prevented.

As illustrated in FIGS. 1, 4, and 6(a), the vehicle body rear structure of the present invention is provided with the seat striker 38 at the vehicle body side to be engaged with the engaging part 16a of the folding seat back 16 which constitutes the rear seat 14. Here, the wheelhouse extension 13B as a swelling portion is formed at the rear wheelhouse inner panel 13 as being extended upward in a state where the cross-section is curved to protrude toward the vehicle room side. The dogleg-shaped closed cross-section is formed with the stiffener 36 and the rear wheelhouse inner panel 13 by attaching the stiffener 36 to the vehicle-interior-side surface of the wheelhouse extension 13B. Then, the seat striker 38 is attached to the vehicle-interior-side surface of the stiffener 36 via the bracket 37.

According to the above constitution, since the dogleg-shaped closed cross-section is formed with the wheelhouse extension 13B and the stiffener 36 having a curved cross-section, stiffness of the seat striker attaching portion 40 can be ensured.

Accordingly, even if the seat striker 38 is apart from the damper attaching portion 45 having high stiffness arranged at the wheelhouse inner panel 13, it is not required to increase stiffness using a large-sized stiffener or a patch. Therefore, the small-sized stiffener 36 can be used for reinforcing the seat striker attaching portion 40, so that reduction in weight and parts count can be achieved.

As shown in FIGS. 7B, 7C and 7D, the stiffener 36 is joined to the wheelhouse extension 13B by welding and the bracket 37 is joined to the stiffener 36 by welding. Since the number of welded portions between the wheelhouse extension 13B and the stiffener 36 is larger than the number of welded portions between the stiffener 36 and the bracket 37, the load acting on the rear seat 14 (FIG. 1) can be more likely to be distributed as being transmitted in the order of the seat striker 38, the bracket 37, the stiffener 36 and the rear wheelhouse inner panel 13.

As illustrated in FIG. 4, an upper end flange 13a is formed at the wheelhouse extension 13B and the upper end flange 13a is joined to the roof side rail 22 being the roof rail. Accordingly, stiffness of the rear wheelhouse inner panel 13 can be increased and the seat load acting on the rear seat 14 can be distributed from the rear wheelhouse inner panel 13 to the roof side rail 22.

As shown in FIGS. 4 and 6(b), the stiffener 36 and the damper attaching portion 45 provided on the rear wheelhouse inner panel 13 are joined as being continued along the curved surface of the rear wheelhouse inner panel 13. Accordingly, the rear wheelhouse inner panel 13 can be reinforced continuously with the stiffener 36 and the damper attaching portion 45.

Figure 3:
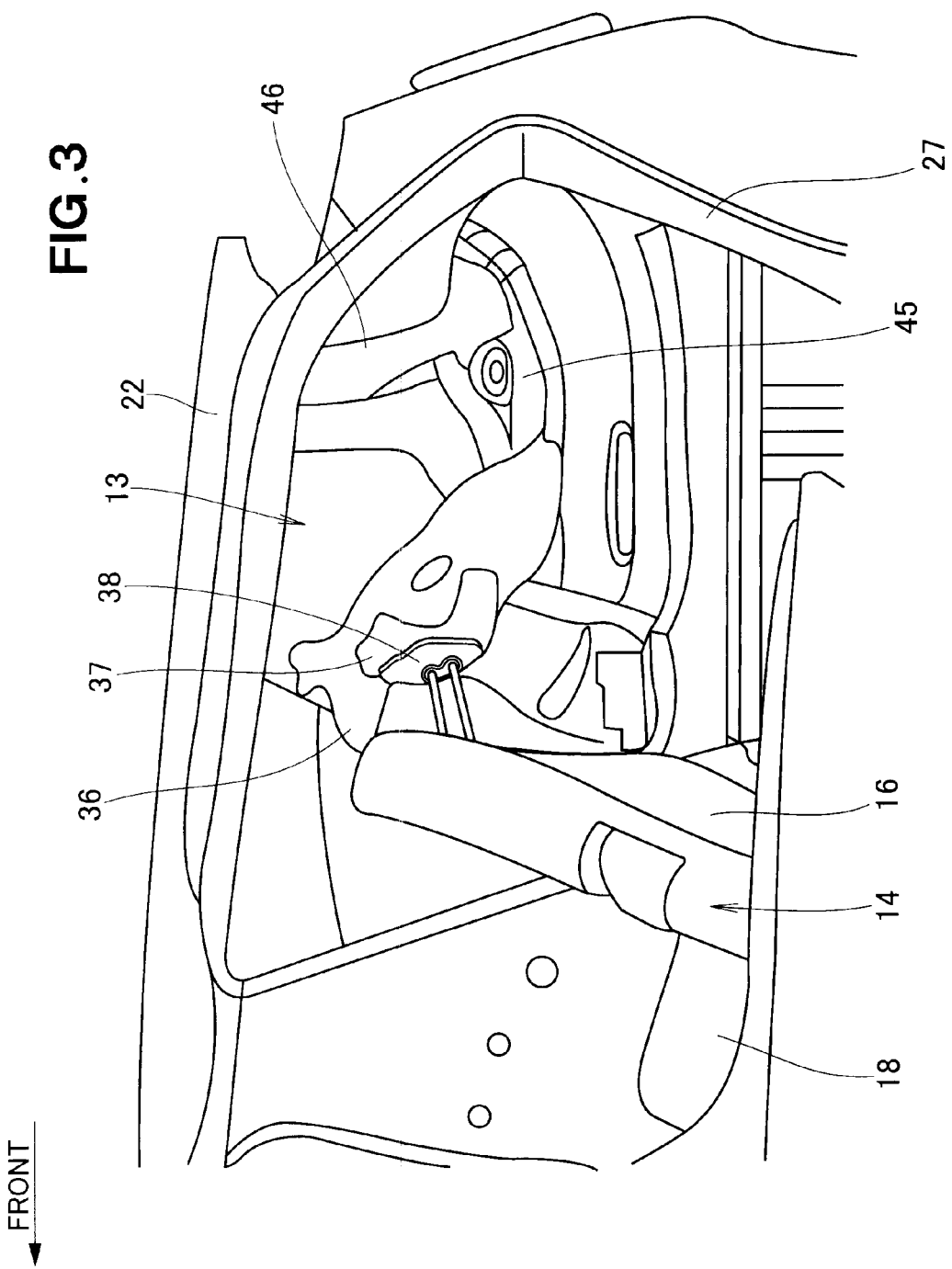
FIG. 3 is a perspective view of the vehicle body rear structure of FIG. 1, as viewed from an obliquely upper side.

As illustrated in FIGS. 3 and 4, the upper surface of the damper attaching portion 45 is connected to the roof side rail 22 with the damper attaching portion stiffener 46 being a reinforcement member. Accordingly, damper supporting stiffness can be increased as the damper attaching portion 45 being reinforced. Further, since the damper attaching portion 45 is also joined to the stiffener 36, the seat striker attaching portion 40 is reinforced as well. Therefore, the rear seat 14 (FIG. 1) can be supported further strongly.

INDUSTRIAL APPLICABILITY

The vehicle body rear structure of the present invention is suitable for automobiles.

Legends:
13 Rear wheelhouse inner panel
13B Swelling portion (Wheelhouse extension)
13a Upper end flange
14 Seat (Rear seat)
16 Seat back
16a Engaging part
22 Roof rail (Roof side rail)
36 Stiffener
37 Bracket
38 Seat striker
45 Damper attaching portion
46 Reinforcement member (Damper attaching portion stiffener)

The invention claimed is:

1. A vehicle body rear structure, comprising:
a seat including a folding seat back;
a rear wheelhouse inner panel forming a part of a vehicle body and curved to protrude toward an inner side of the vehicle body in a vehicle width direction; and
a seat striker provided for undertaking engaging and disengaging between an engaging part provided on a rear face of the seat back and the rear wheelhouse inner panel,
wherein the rear wheelhouse inner panel includes a wheelhouse base forming a lower half part of the rear wheelhouse inner panel and a wheelhouse extension extending integrally upward from an upper end of the wheelhouse base,
a stiffener attached to a vehicle-interior-side surface of the wheelhouse extension and the rear wheelhouse inner panel form a dogleg-shaped closed section,
the seat striker is attached to a bracket provided on at a vehicle-interior-side surface of the stiffener, and
the stiffener and a damper attaching portion provided on the rear wheelhouse inner panel are joined continuously along a curved surface of the rear wheelhouse inner panel.

2. The vehicle body rear structure according to claim 1, wherein the stiffener is joined to the wheelhouse extension by welding, the bracket is joined to the stiffener by welding, and the number of welded portions between the wheelhouse extension and the stiffener is larger than the number of welded portions between the stiffener and the bracket.

3. The vehicle body rear structure according to claim 1, wherein the wheelhouse extension has a flange at an upper end thereof, and the upper end flange is joined to a roof rail.

4. The vehicle body rear structure according to claim 1, wherein the damper attaching portion has an upper surface, and the upper surface of the damper attaching portion is connected to a roof rail via a reinforcement member.

* * * * *